United States Patent [19]
Swilik, Jr. et al.

[11] Patent Number: 5,623,918
[45] Date of Patent: Apr. 29, 1997

[54] INDUCER CONDENSATE CHANNEL

[75] Inventors: Robert C. Swilik, Jr., Indianapolis; Merle D. Sears, Mooresville; Randall E. Light, Indianapolis, all of Ind.

[73] Assignee: Carrier Corporation, Syracuse, N.Y.

[21] Appl. No.: 499,141

[22] Filed: Jul. 7, 1995

[51] Int. Cl.[6] .................................................. F24H 3/02
[52] U.S. Cl. .................. 126/110 R; 110/162; 126/116 R
[58] Field of Search ........................ 126/110 R, 116 R, 126/99 R; 110/162; 165/70, 71

[56]  References Cited

U.S. PATENT DOCUMENTS 5,368,010  11/1994  Weber, III et al. ............. 126/110 R
5,379,751  1/1995  Larsen et al. ................... 126/110 R

*Primary Examiner*—Henry A. Bennett
*Assistant Examiner*—Susanne C. Tinker

[57]  ABSTRACT

A high efficiency furnace having a heat exchanger and an inducer fan housing attached to the flue gases exit of the heat exchanger to draw flue gases out of the exchanger and force the gases out of the furnace under pressure through a venting system. A condensate return channel is provided for directing condensate developed in the vent system back into the inducer housing where it its removed from the furnace by a drain.

16 Claims, 4 Drawing Sheets

INDUCER CONDENSATE CHANNEL

BACKGROUND OF THE INVENTION

This invention relates to a high efficiency furnace and, in particular, to a method and apparatus for removing condensate from a high efficiency furnace.

In recent years, high efficiency furnaces have been developed which are capable of utilizing most of the energy that is available in the fuel that is burned. Typically, these furnaces contain a primary heat exchanger and a secondary heat exchanger that are mounted in series. The hot gases of combustion, herein referred to as flue gases, are passed through the heat exchangers in heat transfer relation with comfort air to efficiently heat the comfort air to a desired level. An inducer fan is connected to the flue gas exit of the secondary heat exchanger to draw the flue gases through the heat exchanger system and force the gases under pressure through the venting system of the furnace.

With furnace efficiencies in excess of 90%, any moisture contained in the flue gases will form from condensate in the gas flow as it moves from the secondary heat exchanger through the inducer fan housing into the vent system. Furnace standards require that the condensate be collected and removed from the furnace to insure that it does not harm the working parts and surfaces of the furnace.

It has been found that under the influence of the inducer fan, the velocity of the flue gases leaving the inducer fan housing are high enough to create pressures in the vent pipe such that the condensate accumulates in the vent system. The condensate builds up in the vent system and is finally released when it overcomes the holding pressure of the flue gas flow. Upon release, the condensate "slugs" back into the inducer housing. This, in turn, creates unwanted furnace noise and, under certain conditions, slows down the inducer fan causing the pressure sensor switch to drop out, shutting down the furnace. Under certain operating conditions, the condensate can build up in the vent system such that vent pressures are reduced to a level where proper venting cannot be maintained and undesirable turbulent flow conditions are created which again, produces unwanted noise.

SUMMARY OF THE INVENTION

It is a primary object of the present invention to improve high efficiency furnaces and, in particular, high efficiency multi-poise furnaces.

It is a further object of the present invention to more effectively handle flue gas condensate in a high efficiency furnace.

A still further object of the present invention is to reduce unwanted noise in a high efficiency furnace.

Another object of the present invention is to provide a condensate removal system that can operate effectively in any one of many furnace orientations.

These and other objects of the present invention are attained in a high efficiency furnace having a heat exchanger and an inducer fan housing attached to the exit of said heat exchanger for drawing flue gases through the heat exchanger and forcing said gases under pressure through an exhaust port into a vent pipe. A condensate return channel is provided in the flue gas flow path leaving the inducer housing. The return channel is arranged so that it sees a lower pressure than the pressure in the flue gas flow whereby any condensate developed in the vent system is able to counterflow back into the inducer housing where it is drained from the furnace.

BRIEF DESCRIPTION OF THE DRAWINGS

For a better understanding of these and other objects of the present invention, reference will be made to the following detailed description of the invention which is to be read in association with the accompanying drawings, wherein.

DESCRIPTION OF THE INVENTION

Figure 1:
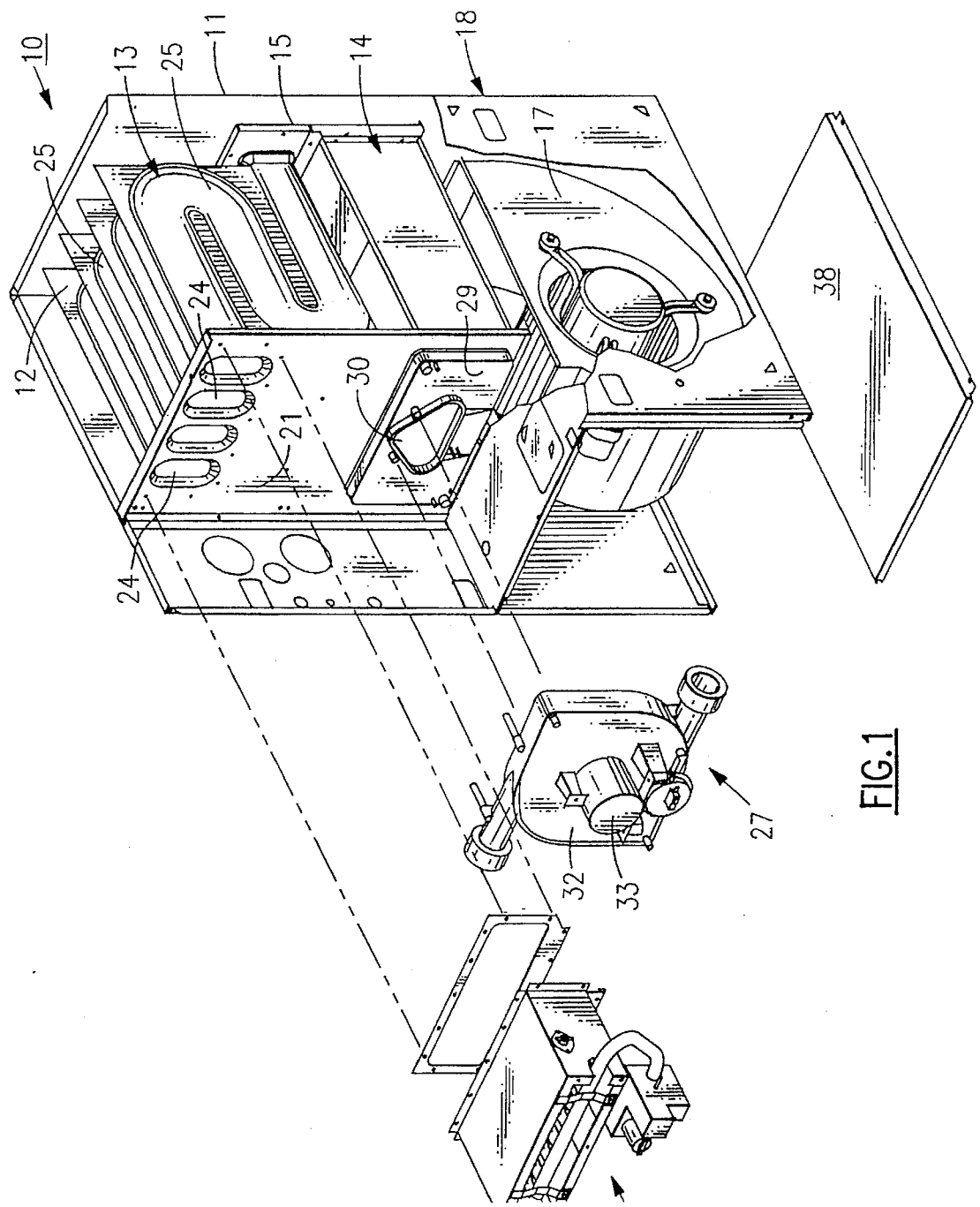
FIG. 1 is an exploded perspective view showing a high efficiency multi-poised furnace embodying the teachings of the present invention.
Figure 2:
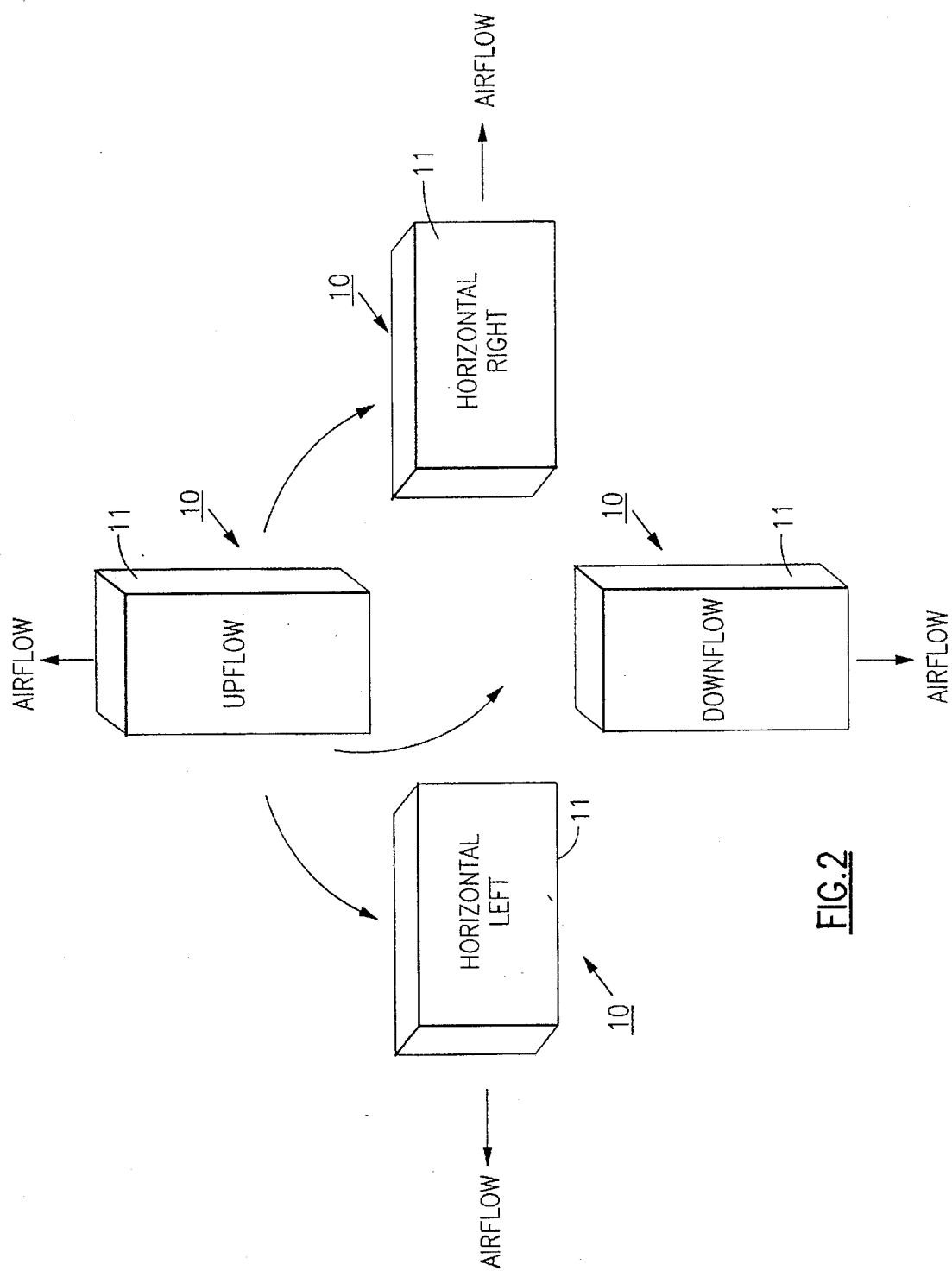
FIG. 2 is a diagrammatic view showing the furnace of the present invention in different orientations.

Referring initially to FIGS. 1 and 2, there is illustrated a multi-poise furnace, generally referenced 10 that is housed within a relatively compact rectangular shaped enclosure 11. The furnace, as shown in FIG. 1, is in an upflow orientation wherein return air from a comfort zone being serviced is drawn into the furnace through a bottom opening and is passed upwardly through supply air duct 12 and discharged through the top of the enclosure.

Although not shown, the furnace is configured so that the comfort air entrance can be selectively located in either the bottom wall or one of the two side walls of the furnace enclosure, depending upon the furnace orientation that is selected. A primary heat exchanger 13 and a secondary heat exchanger 14 are mounted in series within the return air duct. The heated combustion gases are drawn through the heat exchangers and the heat energy is transferred into the return air as it passes over the outer surfaces of the exchangers.

The term top or bottom, and other relative terms relating to the furnace position, are used herein to describe various components or sections of the furnace when the unit is in an upflow orientation as illustrated in FIG. 1. It should be clear, however, that the furnace may be placed in a number of different orientations as illustrated in FIG. 2. These orientations include the previously mentioned upflow orientation wherein return air is discharged through the top of the furnace in an upward direction. When placed in a downflow orientation, return air is drawn through the top of the furnace and discharged in a downward direction through the bottom of the unit. In addition, the furnace, for example, may also be tipped ninety degrees out of the upflow orientation to provide either a horizontal left or a horizontal right return air discharge. The heat exchangers and other components of the furnace are designed to operate efficiently in any one of the available orientations. Regardless of the furnace orientation, condensate can begin developing in the secondary heat exchanger and continue developing in the flue gas flow as it moves through the inducer housing into the vent system.

The major components of the multi-poise furnace are shown in FIG. 1. These include the previously noted primary and secondary heat exchangers which are operatively connected in series by means of a flue gas manifold 15. The manifold conducts flue gases from the primary heat exchanger into the secondary heat exchanger. A return air fan 17 is mounted in the bottom section of the furnace enclosure 18 and is arranged to draw air from the comfort zone and force it through the supply air duct 12 whereby the supply air is passed sequentially over the heat transfer surfaces of the secondary heat exchanger and the primary heat exchanger. A burner assembly 20 is mounted upon the vertically disposed panel 21 directly in front of the entry ports 24 to primary heat exchanger stages 25—25. The burner assembly contains a separate burner for servicing each stage. Each burner is adapted to inject high temperature gases, which are the product of combustion, directly into the entrance ports of the heat exchanger stages.

An inducer unit 27 is secured by suitable means on the vertical panel 21 over collector box 29. The collector box assembly forms the back wall of the inducer fan housing. The collector box covers the flue gas exit ports of the secondary heat exchanger and contains a wide outlet that empties the flue gases into the interior of the inducer fan housing 32. A fan motor 33 is centrally mounted on the front of the housing and is arranged to drive an inducer fan 35 which is shown in phantom outline in FIG. 4. The fan functions to draw the flue gases through the heat exchangers and discharge the gases under pressure through vent pipe system 36, the first section of which is shown at 37 in FIG. 4.

Although not shown, a removable front panel closes the furnace to enclose the burner and the inducer fan units. A floor panel 38 similarly encloses the return air fan section of the furnace. Depending upon the furnace orientation, a return air opening is provided in either the floor panel or one of the side wall panels of the furnace enclosure.

It is well known that this type of high efficiency furnace will extract a large percentage of the available energy from the flue gases and, as a result, condensate will begin to form in the secondary heat exchanger and continue to develop in the flue gas flow as it moves through the inducer fan housing and the vent system. As noted above, if the condensate is allowed to accumulate in the vent pipe, it will produce unwanted noise and can adversely effect the furnace performance. As will be explained in further detail below, the present invention is designed to prevent condensate from collecting in the flue gas vent system and will rapidly and effectively remove condensate from the furnace, regardless of the furnace's orientation.

Figure 3:
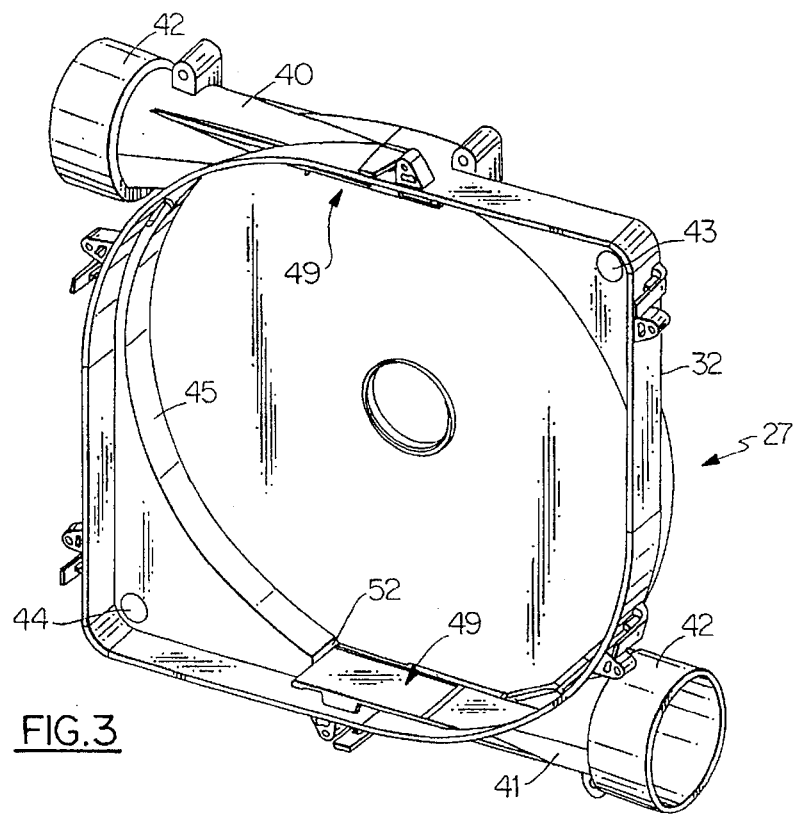
FIG. 3 is an enlarged perspective view looking into the back of the inducer fan housing of the present furnace.
Figures 4, 7:
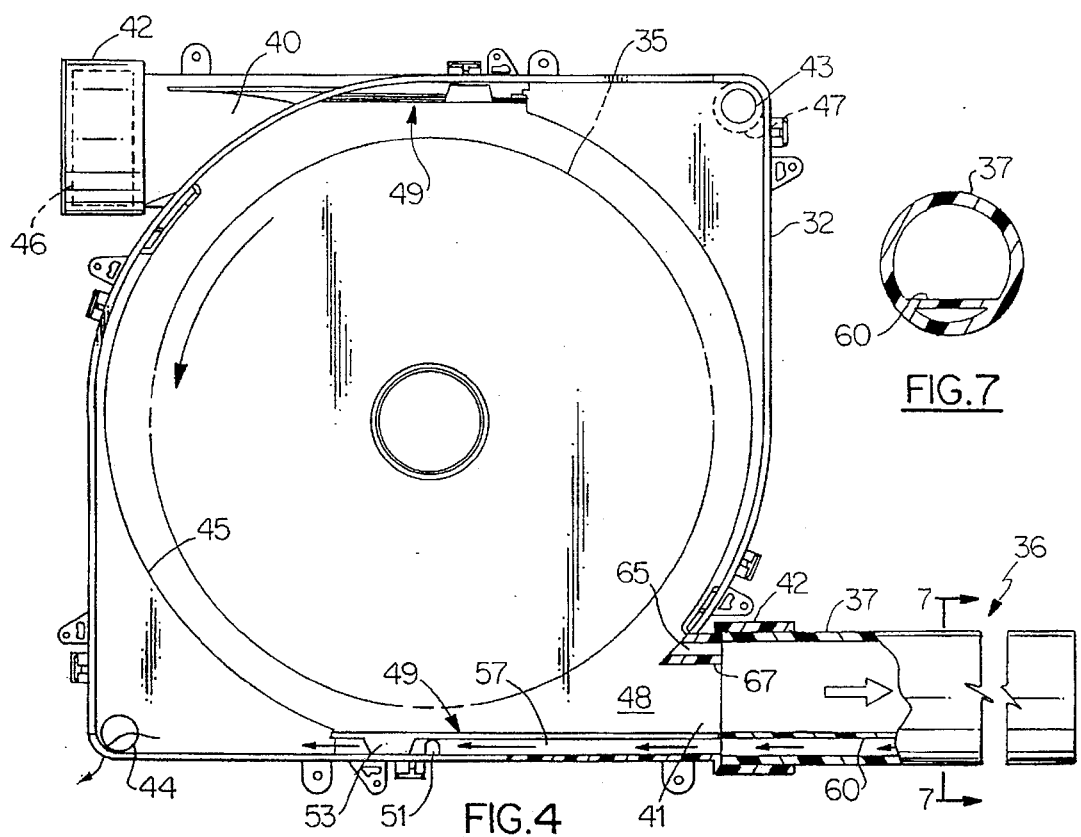
FIG. 4 is a slightly enlarged rear elevation of the inducer fan housing.
FIG. 7 is a cross-sectional view taken along line 7—7 in FIG. 6.
Figure 5:
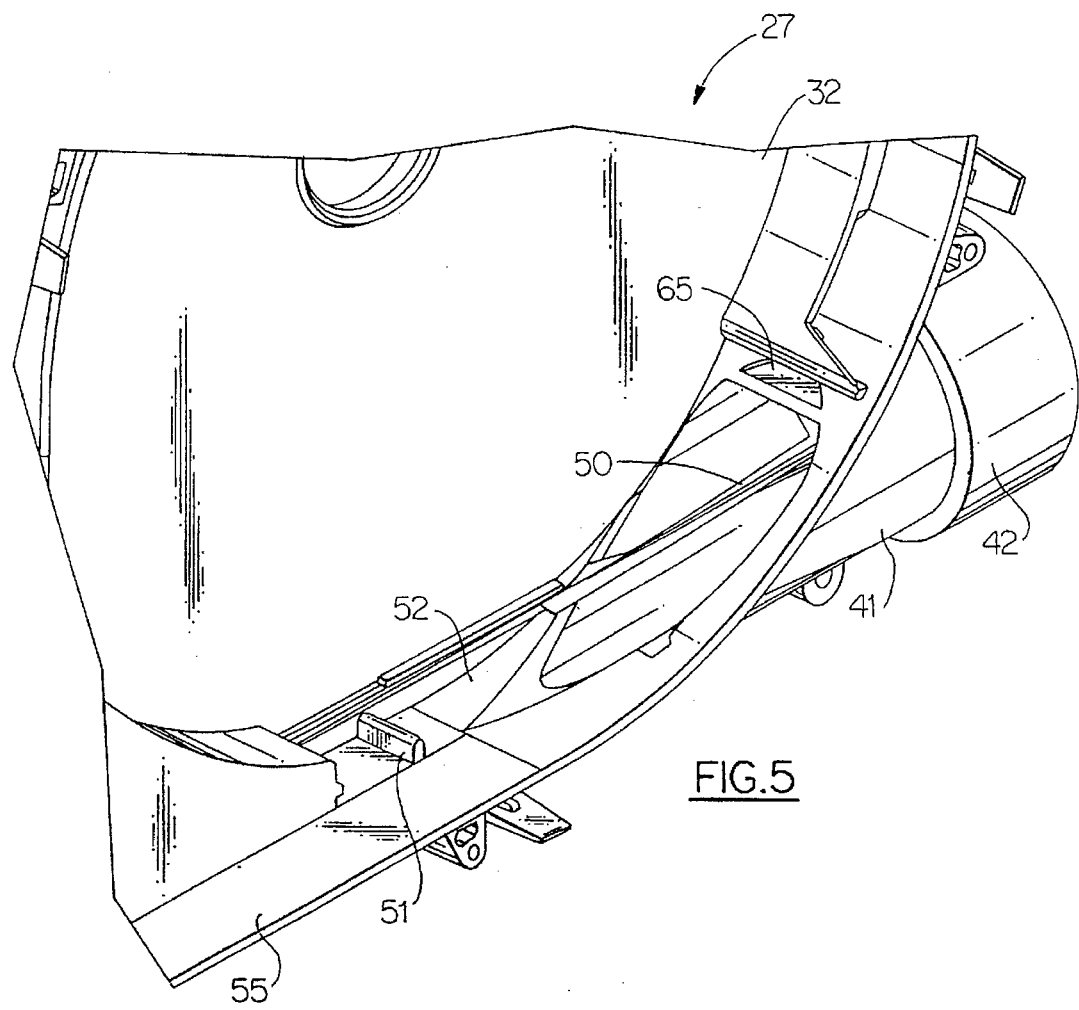
FIG. 5 is a further enlarged partial view, in perspective, of the inducer fan housing showing the inside of an exhaust port through which flue gases are vented.

As illustrated in FIGS. 3–5, the inducer housing is generally rectangular in form and contains a pair of flue gas exhaust ports 40 and 41 that extend outwardly from two diagonally opposed corners of the housing. Each exhaust port is of similar construction and is equipped with a vent pipe connector 42 that is adapted to receive a first section of vent pipe 37 therein to create a gas-tight joint between the exhaust port and the vent pipe. Drain ports 43 and 44 are also mounted in the inducer housing at the two remaining corners for conducting condensate out of the housing. Depending upon the furnace orientation, one of the gas exhaust ports and one of the drain ports will be selected for use and the other ports will be blocked off using suitable closure devices 46 and 47. For explanatory purposes, it is assumed that the furnace is in an upflow orientation and the exhaust port 40 and the drain port 43 are blocked off.

The interior of the inducer housing contains a shroud 45 that encircles a major portion of the inducer fan 35. The shroud is arranged to help direct the flue products into the open gas exhaust port which, in this case, is port 41. Under influence of the fan, the flue gases reach peak velocity and pressure within the entrance region 48 of the exhaust port and are thus driven outwardly through the vent pipe. It is this high pressure flow that has heretofore held condensate in the vent pipe system until such time that the weight of the accumulated condensate can overcome the flow pressure and return to the inducer housing for removal. As will be explained in further detail below, a condensate return channel is placed adjacent to this high pressure flow path through which condensate that is formed in the vent system is routed back to the inducer housing around the area of high pressure.

Figure 6:
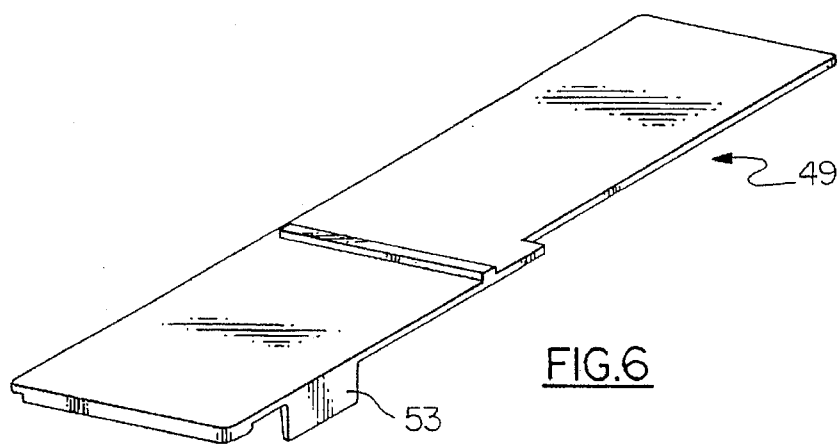
FIG. 6 is a perspective view of a baffle that forms the top wall of a return channel for directing condensate that is formed in the vent system of the furnace back into this inducer fan housing.

A baffle 49, as illustrated in FIG. 6, is mounted in the lower section of the inducer housing and is arranged to pass some distance into the flue gas exhaust port. The baffle is slidably contained within a groove 50 formed in the front wall of the housing and which extends into the exhaust port. The baffle is configured so that when the front edge is mounted within the groove, the back edge is tightly fitted against the front face of the inducer housing 32 (FIG. 1). The baffle, in assembly, rests upon a rib 51 contained in a recess 52 formed in the shroud of the housing and is further supported by a leg 53, some distance above the side wall 55 of the housing. As can be seen, the baffle, in assembly, establishes a condensate return channel 57 that extends from the gas exhaust port back into the housing.

With further reference to FIGS. 4 and 7, the first section of vent pipe 37 that is inserted into the exhaust port connector 42 is provided with an interior wall 60 which, in assembly, is coextensively aligned with the baffle to further extend the condensate return channel 57 some distance into the vent pipe system. As noted above, the area of highest pressure in the flue gas flow path is at the entrance to the exhaust port. By construction, the area inside the condensate return channel is shielded from this high pressure area and in effect, sees an area of lower pressure upstream from the exhaust port. Accordingly, any condensate that is developed in the vent system will follow the path of least resistance within the channel back into the bottom section of the inducer housing. Condensate collected in the bottom of the housing is then gravity fed to the drain port 44 and discharged into a suitable disposal system (not shown) that is typically attached to the drain.

As noted above, the present invention is intended for use in a multi-poise furnace which can operate efficiently when placed in a number of different orientations. To accommodate all orientations, a second condensate channel 65 is provided in the upper part of the exhaust port 41. Because of the geometry of the exhaust port, the second channel is rather foreshortened and is easily formed simply by molding a wall 67 into the upper section of the exhaust port. To extend the second channel into the vent system, the first section of vent pipe 37 is simply rotated in connector 42 180° from the position shown in FIG. 4 to bring wall 60 of the vent pipe into alignment with the wall 67 of the second condensate channel.

It should be understood that each flue gas exhaust port 40 and 41 is of similar construction and thus, each is capable of accepting the vent pipe. Only one removable baffle need be supplied with each furnace. As can be seen, the baffle can be selectively mounted in the appropriate exhaust port after the furnace orientation has been decided upon. As should be evident from the disclosure above, the present apparatus provides for efficient handling and removal of condensate in a high efficiency multi-poise furnace in any one of the many available furnace orientations.

While this invention has been explained with reference to the structure disclosed herein, it is not confined to the details set forth and this invention is intended to cover any modifications and changes as may come within the scope of the following claims:

What is claimed is:

1. A high efficiency furnace having a heat exchanger unit through which flue gases flow in heat transfer relation with comfort air, said furnace further including an inducer housing connected to the flue gas outlet of the heat exchanger unit, said inducer housing containing a flue gas exhaust port and an inducer fan for drawing flue gases from said heat exchanger unit and forcing the gases through said exhaust port under pressure into a venting system, a drain means in said inducer housing for removing condensate from said housing, and an open ended condensate return channel mounted within the exhaust port for conducting condensate developed in the gas flow upstream of said return channel back into the housing.

2. The furnace of claim 1 that further includes a vent pipe connected to the exhaust port, said vent pipe having an interior channel that is aligned with the condensate return channel in the exhaust port whereby the condensate return path is extended into the vent system of the furnace.

3. The furnace of claim 2 wherein the inducer housing is vertically disposed in the furnace and the exhaust port is located in the lower section of the housing.

4. The furnace of claim 1 wherein said return channel extends back into the inducer housing from the exhaust port a given distance to shield the interior of the return channel from the high pressure flue gas flow developed in the exhaust port.

5. The furnace of claim 4 wherein said return channel is formed by a side wall of the inducer housing and a baffle mounted between front and rear walls of the housing.

6. The furnace of claim 5 wherein the baffle is retained within a groove formed in the front wall of the housing, said groove extending into the exhaust port.

7. A high efficiency multi-poised furnace having a heat exchanger unit through which flue gases move in heat transfer relation with comfort air, said furnace including, a rectangular shaped inducer housing connected to the outlet of the heat exchanger, said housing having an inducer fan for drawing flue gases from the heat exchanger and discharging the gases into a vent system, an exhaust port located at diagonally opposed corners of the housing, drain means located at each of the other two corners of the housing, an open ended condensate return channel mounted within each of the exhaust ports for conducting condensate developed in the gas flow upstream of the return channel back into the housing, blocking means for closing one of the exhaust ports and one of the drain means whereby a selected one of the exhaust ports and drain means remain open.

8. The furnace of claim 7 that further includes a second condensate return channel located in each of said exhaust ports opposite said other condensate return channel.

9. The furnace of claim 8 that further includes a vent pipe connected to said open exhaust port, said vent pipe having a longitudinal channel therein that can be aligned with either condensate return channel in the exhaust port to extend the return channel into the venting system.

10. The furnace of claim 8 wherein one of the return channels in each exhaust port is formed by a side wall of the housing and a baffle mounted between front and rear walls of the housing.

11. The furnace of claim 10 wherein said baffle is slidably mounted within a groove formed in one of said walls of the housing.

12. The furnace of claim 11 wherein said baffle is interchangeably mounted in one of the return channels of each exhaust port.

13. A method of removing condensate from a high efficiency furnace having a heat exchanger through which flue gases are passed in heat transfer relation with comfort air that includes the steps of connecting an inducer housing to the flue gas exit of the heat exchanger, mounting an inducer fan in the inducer housing to conduct flue gases from the heat exchanger through an exhaust port into a vent system, and mounting an open ended condensate return channel in the exhaust port so that condensate formed in the venting system flows back into said inducer housing through said channel.

14. The method of claim 13 that further includes the step of extending the return channel into the venting system.

15. The method of claim 13 that includes the further step of draining the condensate collected in said housing from said housing.

16. The method of claim 13 that includes the further step of mounting a second exhaust port in said housing having a condensate return channel mounted therein whereby condensate can be returned to the housing when the furnace is placed in one of many orientations.

* * * * *